(12) United States Patent
Coots

(10) Patent No.: US 10,865,527 B2
(45) Date of Patent: Dec. 15, 2020

(54) TIE PLATE ROTATOR FOR FIELD AND GAUGE ORIENTATION

(71) Applicant: B & B Metals, Inc., Shepherdsville, KY (US)

(72) Inventor: Coty T. Coots, Shepherdsville, KY (US)

(73) Assignee: B & B METALS, INC., Shepherdsville, KY (US)

(*) Notice: Subject to any disclaimer, the term of this patent is extended or adjusted under 35 U.S.C. 154(b) by 265 days.

(21) Appl. No.: 15/820,671

(22) Filed: Nov. 22, 2017

(65) Prior Publication Data
US 2019/0153678 A1    May 23, 2019

(51) Int. Cl.
*E01B 29/32*    (2006.01)
*B65G 47/244*   (2006.01)

(52) U.S. Cl.
CPC ........... *E01B 29/32* (2013.01); *B65G 47/244* (2013.01)

(58) Field of Classification Search
CPC .............................. E01B 29/32; B65G 47/244
See application file for complete search history.

(56) References Cited

U.S. PATENT DOCUMENTS

| | | | | |
|---|---|---|---|---|
| 6,807,909 | B1* | 10/2004 | Coots ..................... | E01B 29/32 104/16 |
| 10,329,100 | B1* | 6/2019 | Coots ................... | B65G 47/244 |
| 2011/0100248 | A1* | 5/2011 | Buckley ................. | E01B 29/32 104/16 |
| 2011/0113981 | A1* | 5/2011 | Coots ..................... | E01B 29/32 104/16 |
| 2012/0298481 | A1* | 11/2012 | Fourney ................. | B65G 39/00 198/413 |
| 2019/0153678 | A1* | 5/2019 | Coots ..................... | E01B 29/32 |

* cited by examiner

*Primary Examiner* — Jason C Smith
(74) *Attorney, Agent, or Firm* — Middleton Reutlinger

(57) ABSTRACT

A tie plate rotator which may be mounted in line of a tie plate distribution system along a horizontal or angled conveyor which may take various forms but functionally allows or provides for movement of tie plates from one location to a second. The tie plate rotator receives tie plates and senses a position of the field side or gauge side of the tie plate. Subsequently, the turner will rotate the tie plate if rotation to an alternate orientation is desirable. The tie plate turner also senses a position of the rotating structure so that a controller can determine a position of the tie plate rotator during operation. The tie plates are subsequently directed to a second conveyor for further processing of the tie plates.

17 Claims, 12 Drawing Sheets

TIE PLATE ROTATOR FOR FIELD AND GAUGE ORIENTATION

CLAIM TO PRIORITY

None.

BACKGROUND

1. Field of the Invention

Present embodiments relate to one or more apparatus and methods which rotate a tie plate to orient the gauge and field sides of the tie plate in a desired manner. More specifically, the one or more apparatus and methods provide for sensing of a first orientation and a determination of whether the tie plate is oriented correctly or not and subsequent rotation of the tie plate, if necessary, to properly orient the tie plate relative to a conveyor.

2. Description of the Related Art

In railroad maintenance, tie plates are periodically replaced along with the rails of the railroad track. When the spent materials are removed from the railroad ties, a tie plate distribution system may be utilized to dispense tie plates on or near the railroad ties so that the tie plates may be subsequently installed. Various systems are utilized to dispense or distribute these tie plates and some systems have been created in which tie plates may be separated by a tie plate separator and then positioned on a conveyor belt for subsequent distribution along the path of the railroad track.

In current tie plate distribution systems, sorting and/or separating of tie plates, including orientation of the plates, is a highly manual endeavor. Workers stand along conveyors to lift, rotate and/or orient tie plates for proper feeding location. This typically requires two men on lower output machines and as many as six men on high output or high production machines. When dispensing these tie plates, it is desirable to reduce the number of laborers required to conduct this process. Manual lifting or handling of tie plates may injure laborers and further, automated processes may improve the speed with which the tie plate dispensing may occur. Due to labor costs and a desire to eliminate job functions where lifting or other injuries might occur, it would be desirable to reduce work-related injuries and increase efficiencies where possible. Improved speed of tie plate distribution and general railroad maintenance is always desirable since shutdown of the railroad is necessary to conduct these maintenance procedures and results in down time of the railroad, costing time and money to the railroad companies.

Further, when distributing tie plates along the path of the track, on or near the railroad ties, it is desirable to dispense the tie plates in an organized fashion. This means that the tie plates should desirably be oriented in the orientation related to field and gauge side as dictated during the distribution process.

It would be desirable to provide an apparatus and method for organizing tie plates on a tie plate distribution system which arranges the tie plates and overcomes these and other related to tie plate distribution.

Additionally, it would be desirable to increase the throughput of tie plates to increase efficiencies associated with distribution and therefore decrease the downtime of railroad tracks during maintenance periods when tie plate replacement is necessary.

The information included in this Background section of the specification, including any references cited herein and any description or discussion thereof, is included for technical reference purposes only and is not to be regarded subject matter by which the scope of the invention is to be bound.

SUMMARY

The present application discloses one or more of the features recited in the appended claims and/or the following features which alone or in any combination, may comprise patentable subject matter.

According to some embodiments, a tie plate alignment assembly comprises a feed conveyor, a rotatable conveyor which receives a material from the feed conveyor, a sensor disposed at one of the feed conveyor or the rotating conveyor and sensing an orientation of a tie plate, a first motor which rotates the rotatable conveyor and a second motor which drives conveying of the rotatable conveyor.

In some optional embodiments, any of the following features may be used with the tie plate assembly alone or in combination. The tie plate alignment assembly may comprise at least one second sensor which senses a position of the rotatable conveyor. The tie plate alignment assembly may further comprise a sensor target disposed on the rotatable conveyor detection. The tie plate alignment assembly may further comprising a third sensor. The tie plate alignment assembly may further comprise a second sensor target for detection by said third sensor. The first sensor may detect a tie plate shoulder in a first position. The first sensor may detect a tie plate shoulder in a second position. The tie plate alignment assembly may further comprise a transmission connected to the first motor.

According to some embodiments, a method of aligning tie plates comprises the steps of conveying a tie plate to a rotatable conveyor, sensing with a sensor if a shoulder on the tie plate is in a preselected position, determining with a controller if the tie plate is in a preselected position and, rotating the rotatable conveyor if the tie plate shoulder is in the preselected position.

According to some optional embodiments of the method and the assembly, the method may further comprise driving the first motor during the rotating of the rotatable conveyor. The method may further comprise detecting a position of said rotatable conveyor. The method may further comprise detecting at least one of two rotational limits. The method may further comprise detecting at least one sensor target. The at least one target may be a first sensor target at a first rotational limit and a second sensor target at a second rotational limit. The method may further comprise actuating, with a button or switch, the rotating. The method may further comprise actuating, with a button or switch, a motor driving wheels of the rotatable conveyor. The method wherein the preselected position is one of a desired position or an undesired position.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the various embodiments may be gleaned from the disclosure herein. Therefore, no limiting interpretation of this summary is to be understood without further reading of the entire specification, claims and drawings, included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

In order that the embodiments may be better understood, embodiments of the tie plate rotator in accordance with the present invention will now be described by way of examples. These embodiments are not to limit the scope of the present embodiments as other embodiments of the tie plate rotator will become apparent to one having ordinary skill in the art upon reading the instant description. Examples of the present embodiments are shown in figures wherein.

DETAILED DESCRIPTION

Figure 1:
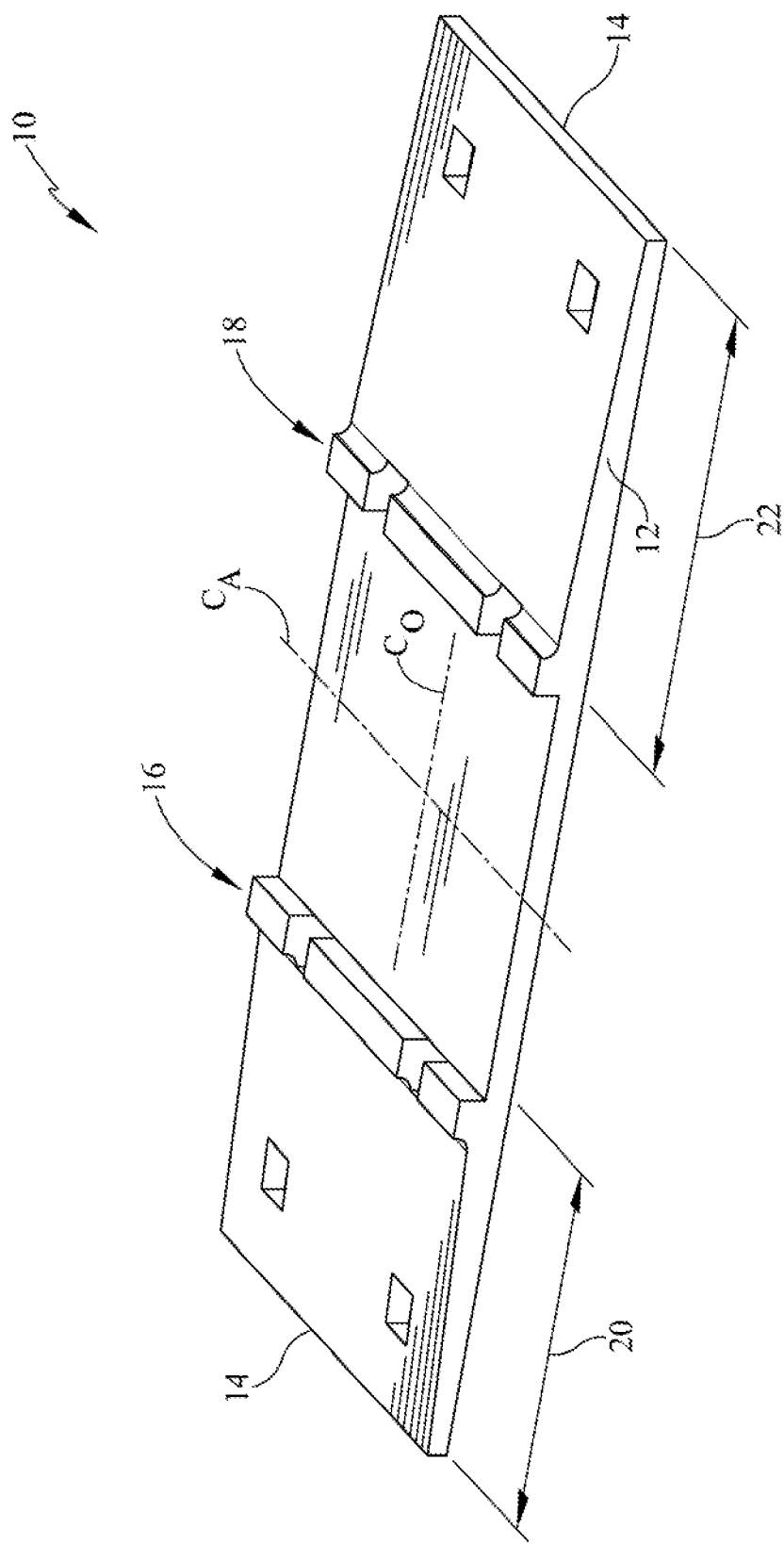
FIG. 1 depicts a perspective view of an illustrative tie plate having a field side and a gauge side.

It is to be understood that the tie plate rotator is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Referring now in detail to the drawings, wherein like numerals indicate like elements throughout several views, there are shown in FIGS. 1-12A various aspects of a tie plate rotator. Present embodiments provide a tie plate rotator which may be mounted in line of a tie plate distribution system along a horizontal or angled conveyor and which may take various forms but functionally allows or provides for movement of tie plates from one location to a second. The rotator may alternatively be used in lines with manual sorting to rotate the tie plates to a desired orientation. The tie plate rotator also receives tie plates and senses a position of the field side or gauge side of the tie plate. Subsequently, the rotator will rotate the tie plate about a generally vertical axis, or an axis perpendicular to an upper surface of the tie plate, if rotation to an alternate orientation is desirable. The tie plate rotator also senses a position of the rotating structure so that a controller can appropriately position the tie plate during operation. The tie plates are subsequently directed to a second conveyor for further processing of the tie plates.

Referring now to FIG. 1, a perspective view of an illustrative tie plate is depicted. The tie plate 10 is generally rectangular in shape having two longitudinal edges and two lateral edges wherein the longitudinal corresponds to the long side 12 of the tie plate and the lateral corresponds to the short sides 14 of the tie plate 10. The longitudinal direction is parallel to the axis $C_O$ and the lateral direction is parallel to the axis $C_A$. These directions are distinguished from the longitudinal direction of the conveyor which is generally in the direction of movement of the tie plates along the conveyor.

The tie plate 10 also has a first shoulder 16 and a second shoulder 18. In some embodiments, the tie plate may have a single shoulder. In either or other embodiments, the tie plate rotation is desirable for the plates which are not symmetrical with regard to the shoulder(s). In the instant embodiment, the first shoulder 16 is closer to the lateral side 14 than the second shoulder 18 is to the adjacent lateral side 14. In the instant embodiment, the difference from first shoulder 16 to the closest lateral side 14 is referred to as the gauge side 20. Alternatively, at the opposite end of the tie plate 10 the distance between the second shoulder 18 and the closest lateral side 14 is referred to as the field side 22. According to some embodiments, the field side 22 and gauge side 20 may be of equal length and if all other factors are the same, then the tie plate 10 may be centered about a center line extending through the tie plate 10 in either the latitudinal or longitudinal direction. However, some tie plates may have only a single shoulder and other tie plates may have two shoulders, as depicted, wherein the shoulders are not equilaterally positioned relative to the lateral sides. Thus the tie plate 10 may be oriented in a manner which is desirable and it may be important to determine the orientation of the tie plate 10 prior to or during the distribution process.

Figure 2:
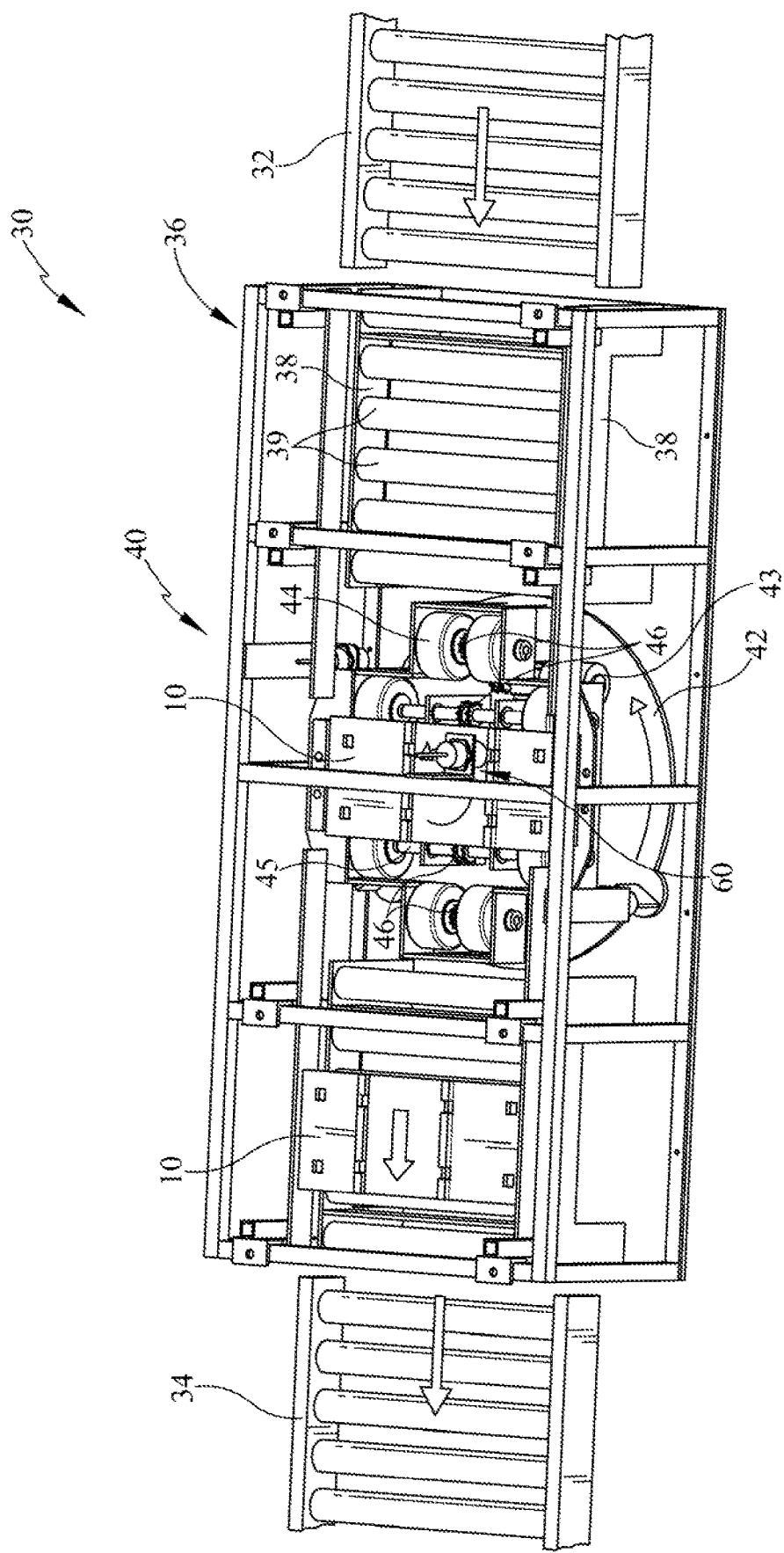
FIG. 2 depicts a perspective view of an illustrative tie plate rotator.

Referring now to FIG. 2, a portion of a tie plate distribution system 30 is depicted in perspective view having a first input conveyor 32 and a second output conveyor 34 as well as the tie plate rotator 40. The tie plate rotator 40 may include portions of the first and second conveyors 32, 34 or may solely include structure(s) to rotate tie plates. The tie plate rotator 40 receives tie plates from the first conveyor 32 and determines a proper orientation of the tie plates 10. Next, the tie plate rotator 40 may rotate the tie plates 10 if necessary to the proper orientation at which time the tie plates 10 are then moved onto the second conveyor 34. The term "conveyor" is used in a broad sense and may include various types of material movers. For example, the conveyor may include roller conveyors which rotate freely or are driven by a motor. The conveyors may also include belt conveyors, gravity feed structures such as slides, gravity chutes, vibrating chutes, driven wheels or rollers, and/or various combinations thereof. Further, drag chains, skate wheel conveyors, roller conveyors, gravity hoppers, shaker tables, and transfer balls may all be utilized and are within the scope of the term conveyor, as used herein. This list however is not exhaustive.

Additionally, the conveyors which may be driven by motors, may utilize electric, hydraulic, and/or pneumatic motors. Further, any of these motors may be direct drive (directly coupled to) the conveyor or may utilize one or more transmissions, which may include but are not limited to, gear transmission, chain drive, gear box, belt drive or combinations thereof. This list of conveyors, motors and/or drives is non-exhaustive and therefore should not be considered all-inclusive or limiting. These motors and or drives should be understood to be usable with any of the conveyors 32, 34, wheels 44 and rollers 39.

For purpose of the present description, the first conveyor 32 is described as having a plurality of rollers and the second conveyor 34 is also described as having a plurality of rollers although such is not limited. The tie plate rotator 40 is disposed therebetween and rotates about a vertical axis to orient the tie plates 10 in a desired manner. Surrounding the first and second conveyors 32, 34 and the tie plate rotator 40 may be a conveyor frame 36. The frame 36 may be solely supported from beneath the conveyors 32, 34 or alternatively, may extend above the conveyors, as shown, to provide additional mounting locations for various hardware. The frame 36 may be formed of one or more structural elements. The frame 36 may provide support for the conveyors 32, 34 and the tie plate rotator 40, as well as allow for connection to other portions of the tie plate distribution system 30, such as a truck or a flatbed railroad car or any such vehicle which may be used as part of the tie plate distribution system 30. As noted previously, portions of the first and/or second conveyors 32, 34 may be located within the frame 36.

The conveyor 32 is shown comprising two support rails 38, as well as a plurality of rollers 39. These rollers 39 may be mounted with bearings to freely rotate or may be driven by a motor which is not shown in this instant embodiment. Alternatively, as previously noted, other types of conveying or material moving structures may be utilized to define this first conveyor 32.

Similarly, the second conveyor 34 is shown in illustrative embodiment and may be formed in a similar manner or alternatively, may be formed in any of a variety of alternative manners, driven or un-driven, to move the tie plates 10 after receiving such from the tie plate rotator 40.

The tie plate rotator 40 is also shown having a rotatable conveyor or platter 42, which may also be referred to as a turntable, is disposed between the first and second conveyors 32, 34. The platter 42 is shown having an arrow which indicates a direction of rotation from its current position to a second position. It is desirable that the platter 42 may be either rotatable 180 degrees both clockwise and counter clockwise or alternatively, rotatable 360 degrees so that the tie plates 10 may always be rotated from a first position to a desired second position along such full rotation. Various angular distances may be utilized. The tie plate rotator 40 also comprises a plurality of driven wheels 44 which receive tie plates 10 and cause movement of the tie plate 10 in the right to left direction of the illustrative embodiment toward the second conveyor 34. It should be noted, however, that the direction of movement of the tie plates 10 is not limiting and that the tie plate distribution system 30 may be developed to move tie plates 10 from the left to right direction as well.

The plurality of wheels 44 may be driven by a motor 43 and the motor 43 may use various types of transmissions or may be a direct drive system in which case each axle 45 may (or may not) have a single motor. In the exemplary embodiment, a plurality of sprockets 46 are shown on the axles 45 which cause the wheels 44 to be driven and rotate in a counter clockwise direction. This directs the tie plates 10 in the right to left direction, as depicted. Alternative arrangements may be utilized including, but not limited to, gear boxes, belt drives, and pulleys, other drives, or combinations of any of the preceding.

The platter 42 may be rotated by a first motor 50 (FIG. 4) and the wheels 44 may be rotated by the second motor 43 so that the wheels 44 may rotate independent of a condition or orientation of the platter 42.

Also shown in FIG. 2 is an orientation sensor 60. The orientation sensor 60 is positioned above the tie plates 10 at a location which corresponds to a desired location of either the field side shoulder 18 (FIG. 1) or the gauge side shoulder 16 (FIG. 1). With the orientation sensor 60 positioned above the desired shoulder, when the tie plate 10 is not oriented in a manner desired, the orientation sensor 60 will not detect the shoulder 16 or 18 and will signal a controller that the tie plate 10 needs to be rotated in order to position the desired shoulder beneath the specified location of the orientation sensor 60.

The orientation sensor 60 may be defined by multiple types of sensing devices or equipment. For example, the sensor 60 may be a proximity sensor, such as an inductive proximity sensor, which senses position or orientation based on a magnetic field. Other sensor types may be capacitance sensors, capacitive, capacitive displacement, radio frequency (RF) sensors, Doppler sensors, eddy current, laser, photocell, other optical sensors, or a camera which detects a desirable or undesirable image for orientation determination. Further, passive or thermal sensors may be used. Radar, sonar, reflection, ultrasonic, hall-effect may also be used. Still further, mechanical sensors, such as mechanical limit, toggle, push-button, contactors, weight sensors and tilt switches may be used. This list is non-exhaustive and should not be considered limiting as other sensing types of equipment may be utilized. Any of these or other sensors may be utilized for the sensors 60, 70, 74, for example.

Figure 3:
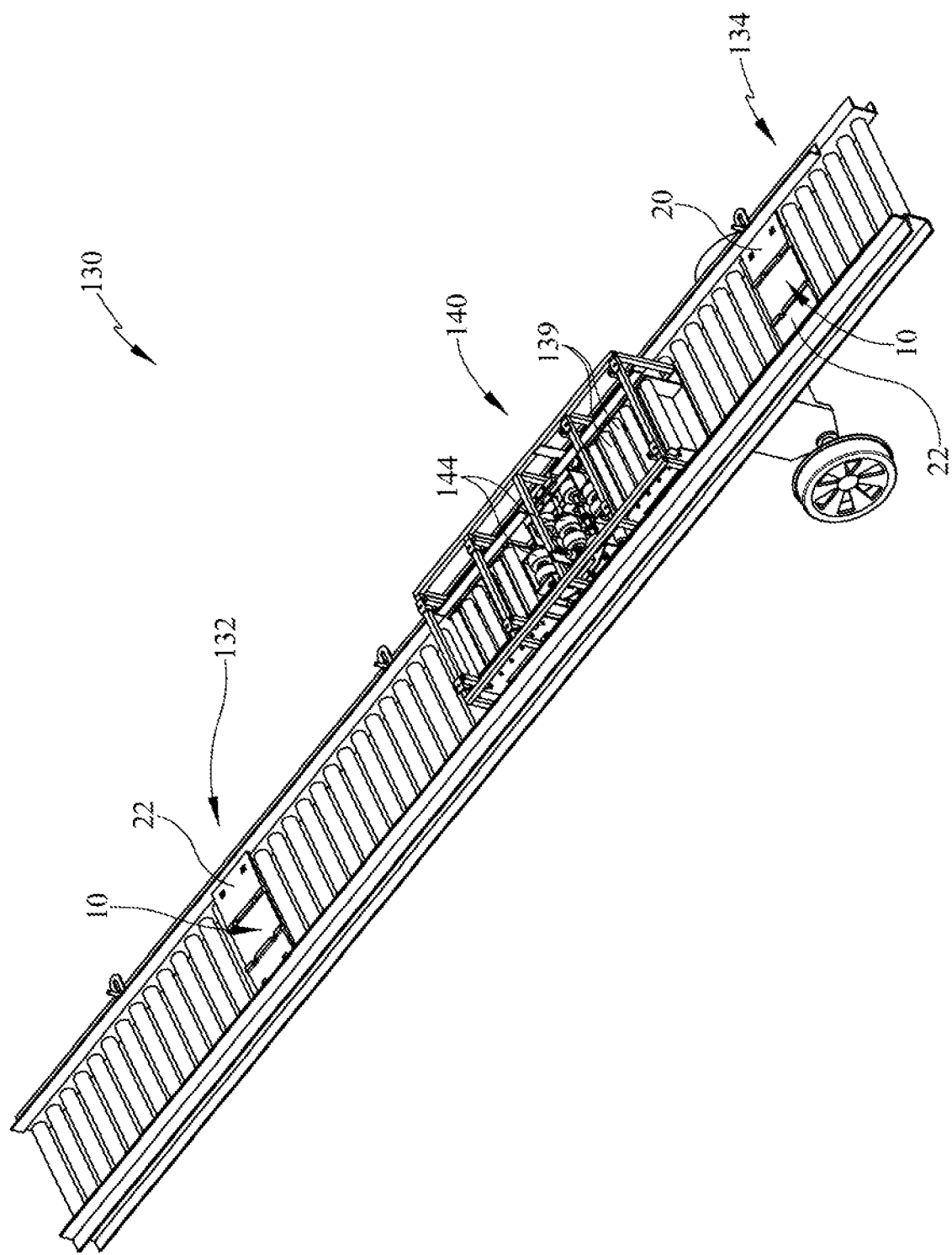
FIG. 3 depicts a perspective view of a second illustrative tie plate rotator which may be positioned on an angled conveyor.

Referring now to FIG. 3, an alternate embodiment is depicted. In this embodiment, the tie plate distribution system 130 is shown including a decline conveyors 132, 134 and the tie plate rotator 140 is shown also depicted on a declining angle. This may alternately be configured alone an incline conveyor as well. In this embodiment, the plurality of rollers 139 of the conveyors 132, 134 are free rolling and utilize gravity feed of the tie plates 10 to move the tie plates from the upper position to a lower position. Within the tie plate rotator 140, the tie plates 10 may be rotated to a desired orientation and further moved to the second conveyor 134. In such embodiment, the wheels 144 of the tie plate rotator 140 can be driven but may not need to be driven, instead rotating freely due to the decline and ability to move on their own. As depicted in this view, the field side 22 is shown in one orientation on the first conveyor 132. However, on the second conveyor 134, the gauge side 20 is shown in a similar position indicating that the tie plate 10 has been rotated by the tie plate rotator 140.

Figure 4:
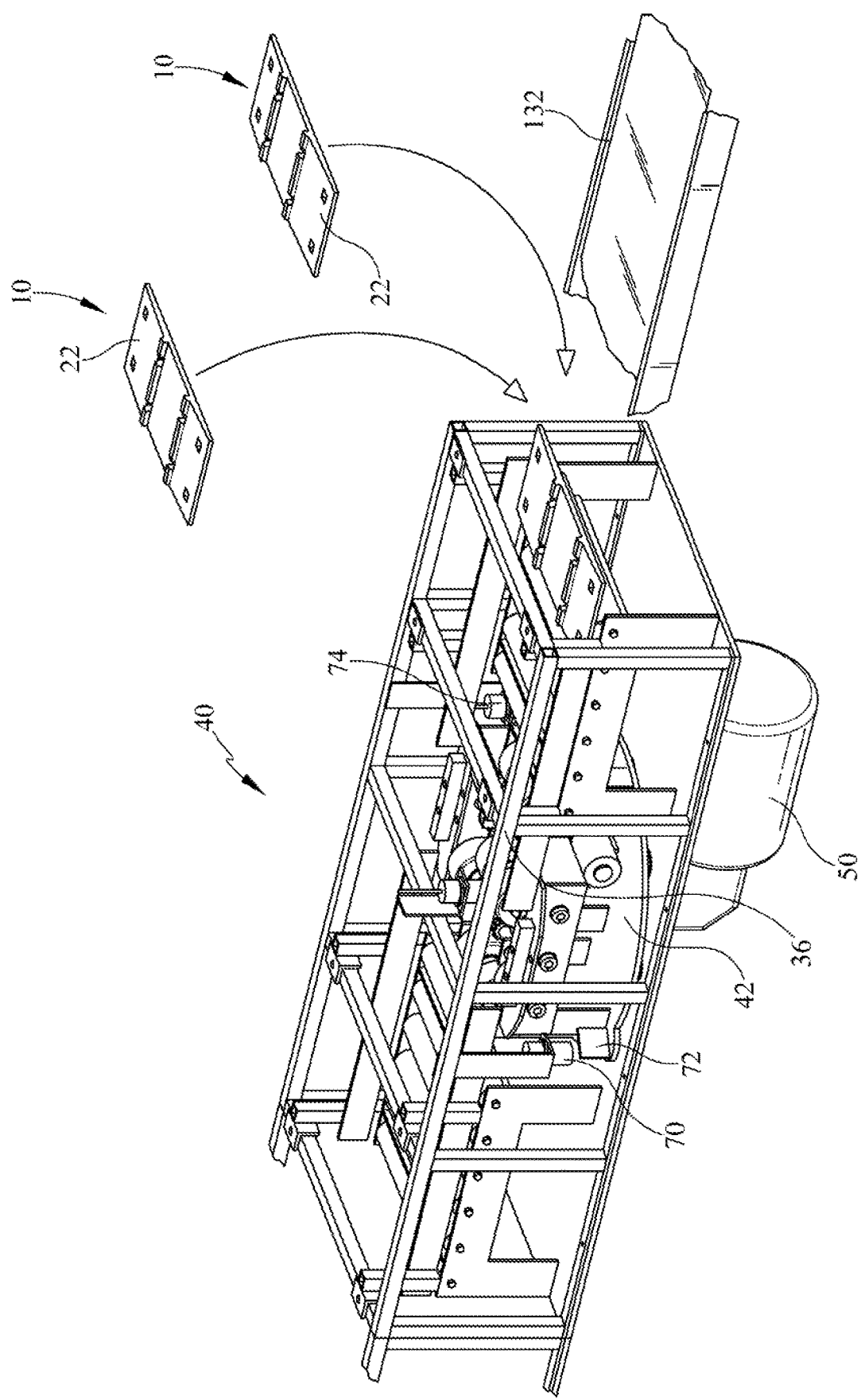
FIG. 4 is an alternate perspective view of the tie plate rotator.

Referring now to FIG. 4, a perspective view of the tie plate rotator 40 is shown. An alternate first conveyor 132 is depicted being defined by a belt conveyor, for example, which feeds to the tie plate rotator 40. Also shown, elevated from the assembly, are two tie plates 10. One tie plate is shown in a first orientation wherein the field side 22 is further from the viewer, whereas in the second orientation the field side 22 is closer to the viewer. This represents how tie plates 10 may be fed to the tie plate rotator 40 in either orientation, whereas only a single orientation is desired on the out bound side of the tie plate rotator 40.

Beneath the frame 36 is a motor 50 which may be connected to a transmission or may directly drive the rotatable platter 42 to move either 360 degrees or 180 degrees. In the instant embodiment, a transmission (not shown) may be used in combination with motor 50 in order to convert the rotation from about a horizontal axis to about a vertical axis. It may be desirable for the structure to rotate 360 degrees from a first position to a second position and then to rotate back to the first position to receive a subsequent tie plate 10. In the alternative, the platter 42 may rotate 180 degrees in one direction and then subsequently 180 degrees in the second direction back to the first position. In addition to the orientation sensor 60 (FIG. 2), the tie plate rotator 40 may also comprise at least one sensor 70 and a sensor flag 72 to indicate a location of the platter 42. This sensor 70 and the accompanying flag 72 allow the sensor 70 to either detect or not detect a position of the platter 42 which signals so that the controller may determine a current position of the platter 42. The sensor 70 may be any of the type previously discussed, but as mentioned before, such list is not considered to be limiting.

Also shown in the figure, is a second position sensor 74 which may cooperate with the flag 76 (now shown), or an alternate flag when a specific portion of the platter 42 is rotated and determines a location relative to the second sensor 74. The second sensor 74 may be optional but may provide a secondary sensor for determining platter 42 position. Likewise, the sensor 74 may be any of the non-exhaustive, non-limiting list previously discussed for sensor 60 for example.

Figure 5:
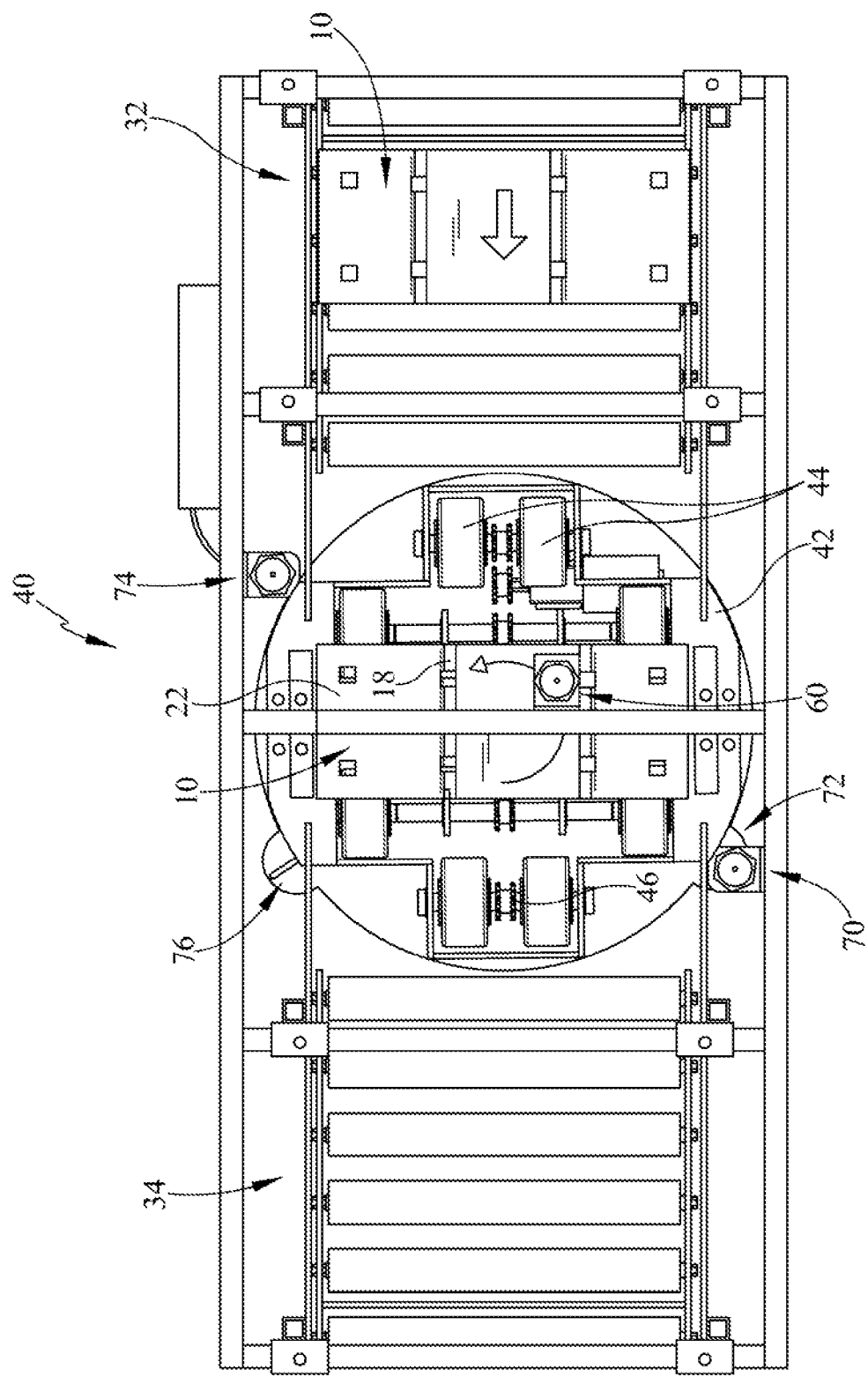
FIG. 5 is a top view of the tie plate rotator in a first sequence of operation.

Referring now to FIG. 5, a top view is shown and is the first of multiple sequence views depicting the operation of the tie plate rotator 40. A tie plate 10 is shown at the first conveyor 32 and moving in a right to a left hand direction. The tie plate 10 is shown in a first orientation with the field side 22 up in the depicted orientation and view. However, it may be desirable that the field side 22 be in the opposite down orientation upon exiting the tie plate rotator 40 at the second conveyor 34. The orientation sensor 60 is shown disposed over a location where the tie plate 10 should detect the field shoulder 18. In this current tie plate orientation, the sensor 60 is not aligned with the field shoulder 18 and therefore, the sensor 60 will send a signal to a controller that there is not a shoulder detection. At this time, a controller 80 (FIG. 9) may then direct the tie plate rotator motor 50 to turn causing rotation of the platter 42. In the depicted non-limiting embodiment, the rotation of the platter 42 would be counter-clockwise. However this is illustrative and non-limiting. The platter 42 may also rotate in the clockwise direction.

At this time, the position sensor 70 and/or sensor 74 may also detect a flag 72 in order to determine the location of the platter 42 to confirm its position for rotation. This may aid in directing either or both of a rotation direction a distance. Also, this flag arrangement may be used to signal a time to rotate or stop rotation of the wheels 44. Likewise, in the instance of driven conveyors 32, 34, the flag 72 may be used to signal a start or stop of one or more conveyors.

Additionally, at the right hand side of the Figure, a second tie plate is shown located on the conveyor 32. The tie plate will move to platter 42 and wheels 44 when the tie plate on the rotator 40 moves to conveyor 34.

Figure 6:
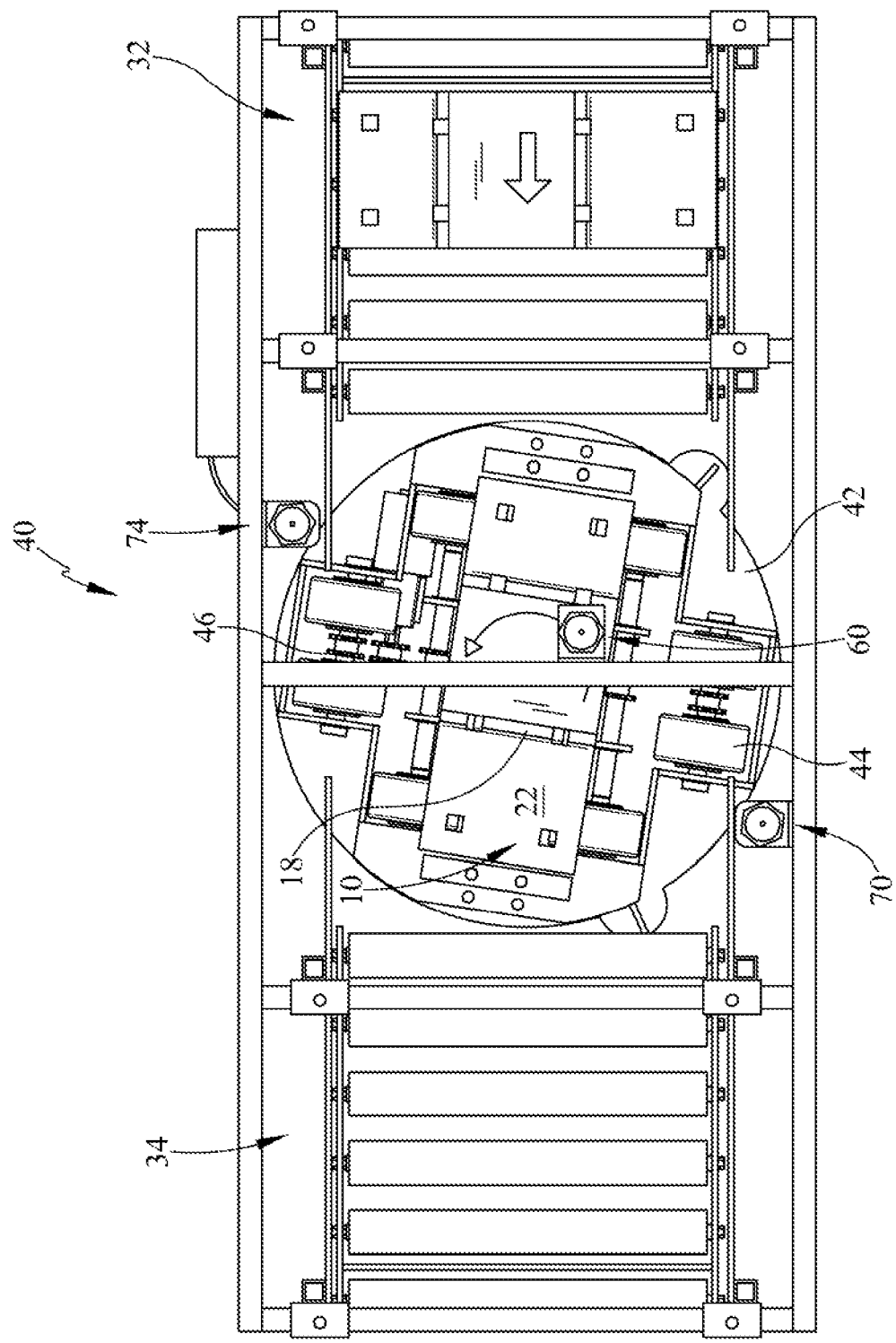
FIG. 6 is a top view of the tie plate rotator in a second sequence of operation.

With reference now to FIG. 6, the tie plate 10 is shown rotated roughly 80 degrees from its position in FIG. 5. The rotation is shown moving in the counter clockwise direction. As the tie plate 10 rotates, the field shoulder 18 is moving downwardly to a position wherein the orientation sensor 60 will be aligned with the field shoulder 18.

Figure 7:
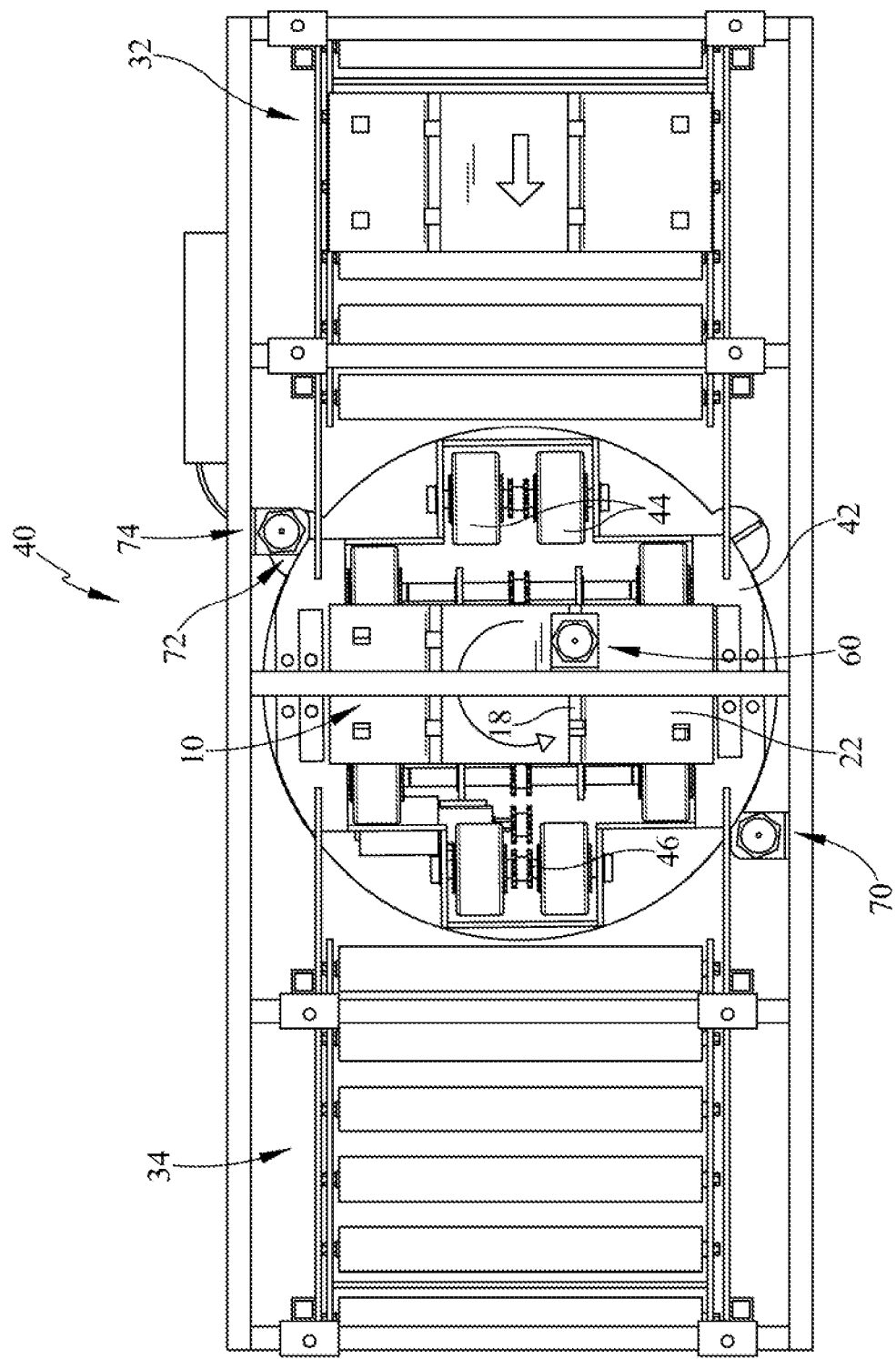
FIG. 7 is a top view of the tie plate rotator in a third sequence of operation.

Referring now to FIG. 7, the tie plate 10 is shown in a subsequent position wherein the orientation sensor 60 is disposed over the field shoulder 18. From this position, the wheels 44 may be rotated by the second motor 43 or motor 43 and transmission to direct the tie plate 10 to the left and onto the second conveyor 34. In this position, the flag 72 is shown disposed beneath the sensor 74 also indicating that the platter 42 is rotated 180 degrees from its earlier position.

Figure 8:
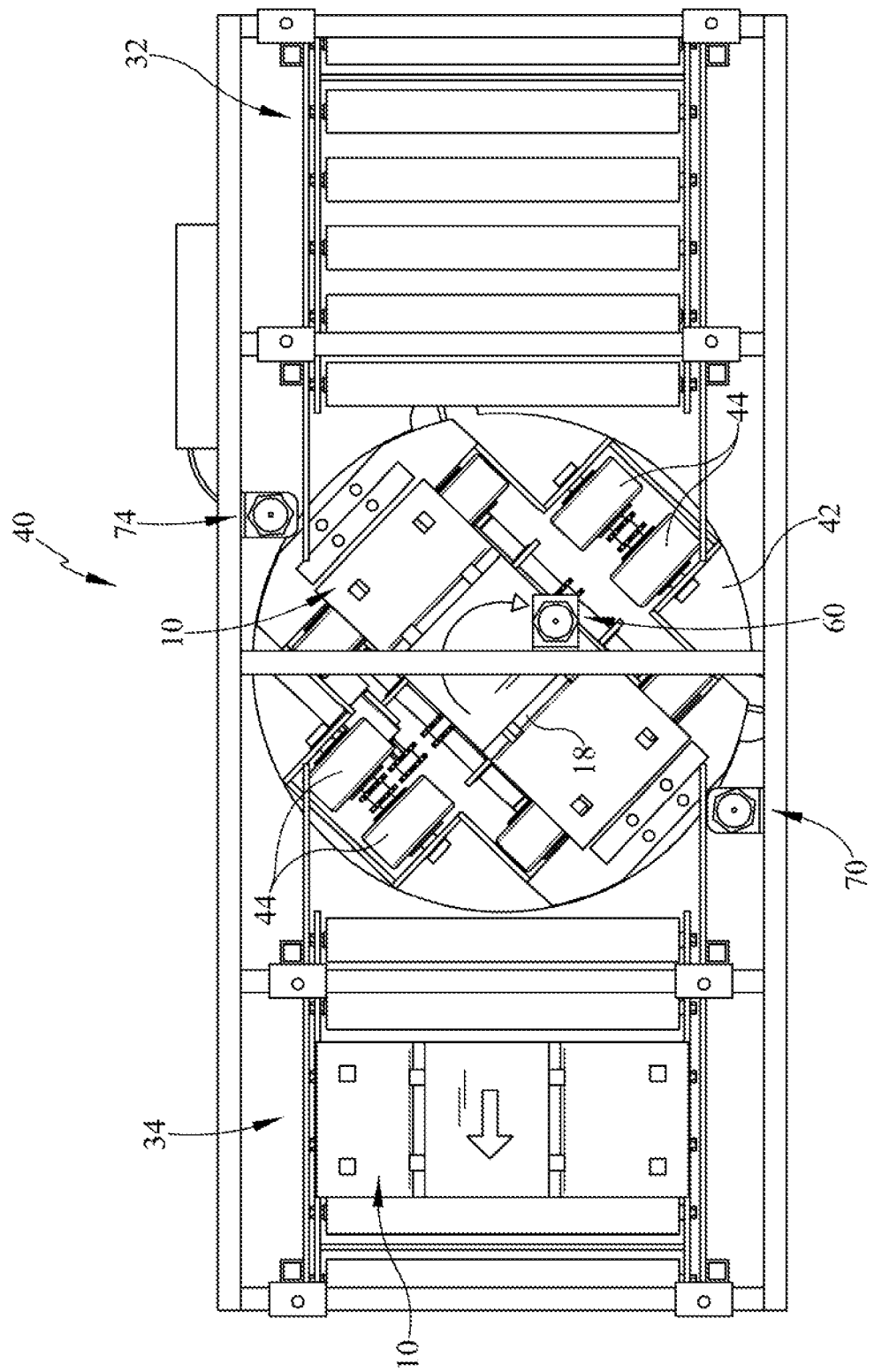
FIG. 8 is a top view of the tie plate rotator in a fourth sequence of operation.

With reference now to FIG. 8, an optional movement is depicted wherein the platter 42 may be rotated so that the wheels 44 return to their initial position of FIG. 5 and this is shown in a clockwise direction. However, in an alternate embodiment, the structure may rotate in a counter clockwise direction. In some embodiments, the platter 42 may stay in its position at FIG. 7 to receive a subsequent tie plate 10 from the first conveyor 32. Alternatively, the platter 42 may be rotated back to its position of FIG. 5 before receiving the next tie plate 10 from the first conveyor 32.

Figure 9:
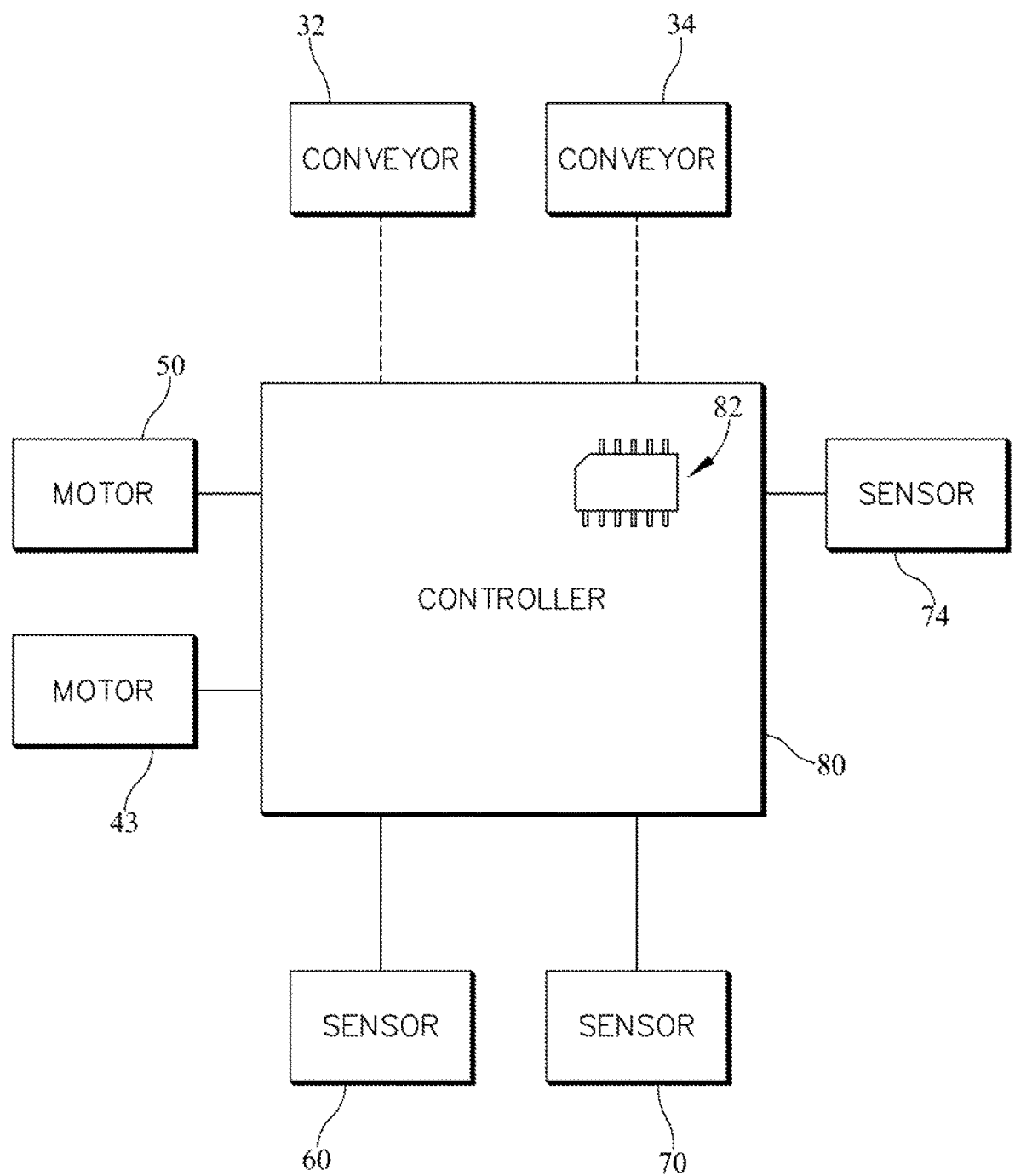
FIG. 9 is a schematic view of a controller layout which controls schematically represented structures of the tie plate rotator.

With reference to FIG. 9, a schematic view of the controller layout is shown for purpose of visualizing interaction with other structures. A controller 80 is shown and may comprise one or more processors which are powered and programmed for receiving and sending signals and for decision making. The term "controller" is used herein generally to describe various apparatus relating to the monitoring of sensor or manual input signals related to the position of the platter and/or the orientation of the tie plate 10 and further the performance of one or more actions in response to occurrence of certain manual or sensor signal data. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various implementations include, but are not limited to, conventional microprocessors, application specific integrated circuits (ASICs), and field-programmable gate arrays (FPGAs).

In various implementations, a processor or controller may be associated with one or more storage media (generically referred to herein as "memory" 82 e.g., volatile and non-volatile computer memory such as RAM, PROM, EPROM, and EEPROM, floppy disks, compact disks, optical disks, magnetic tape, etc.). In some implementations, the memory 82 may be encoded with one or more programs that, when executed by the controller 80, perform at least some of the functions discussed herein. Memory 82 may be fixed within a processor or controller or may be transportable, such that the one or more programs stored thereon can be loaded into a processor or controller so as to implement various aspects of implementations disclosed herein.

The first motor 50 and the second motor 43 are shown in communication with the controller 80 so that the controller 80 may direct rotation or stoppage of the platter 42 rotation. Similarly, the controller 80 may cause rotation of the wheels 44 by powering motor 43 or may stop rotation of the wheels 44 by way of stopping motor 43.

The controller 80 is also in communication with orientation sensor 60 and the at least one sensor 70. The controller 80 may receive a signal from the sensor 60 to determine whether the tie plate 10, or the tie plate shoulder more specifically, is oriented in a desired manner. Once the controller 80 receives a signal and subsequently determines the orientation of the tie plate 10, the controller may additionally make a determination whether or not to rotate the platter 42. For example, the controller 80 may also receive signals from the least one sensor 70 to make a determination about the position of the platter 42 and based on the determination from sensor 60 input, may or may not direct motor 50 to rotate the platter 42. Additionally, sensor 74 is shown for use with sensor 70. One or both of these sensors 70, 74 may be used to also signal the start or stop of conveyors 32, 34 and likewise, may also be used to determine when is an appropriate time to rotate wheels 44 with motor 43. The conveyors 32, 34 are shown in broken line to represent their optional direction by way of the controller 80.

While two sensors are described, according to some embodiments, it is possible to program the controller 80 so that only the sensor detecting, or not detecting, the tie plate shoulder is needed. The controller 80 may include, in some embodiments, for non-limiting example, a programmable logic controller (PLC). The PLC can be programmed such that each time the rotation motor 50 of the platter 42 is activated, contacts of the rotatable motor 50 or the motor 43 reverse polarity. Thus, having the multiple sensors is may be more redundant, however may not be fully necessary thus, other arrangements should be understood as within the scope of present embodiments.

Figure 10:
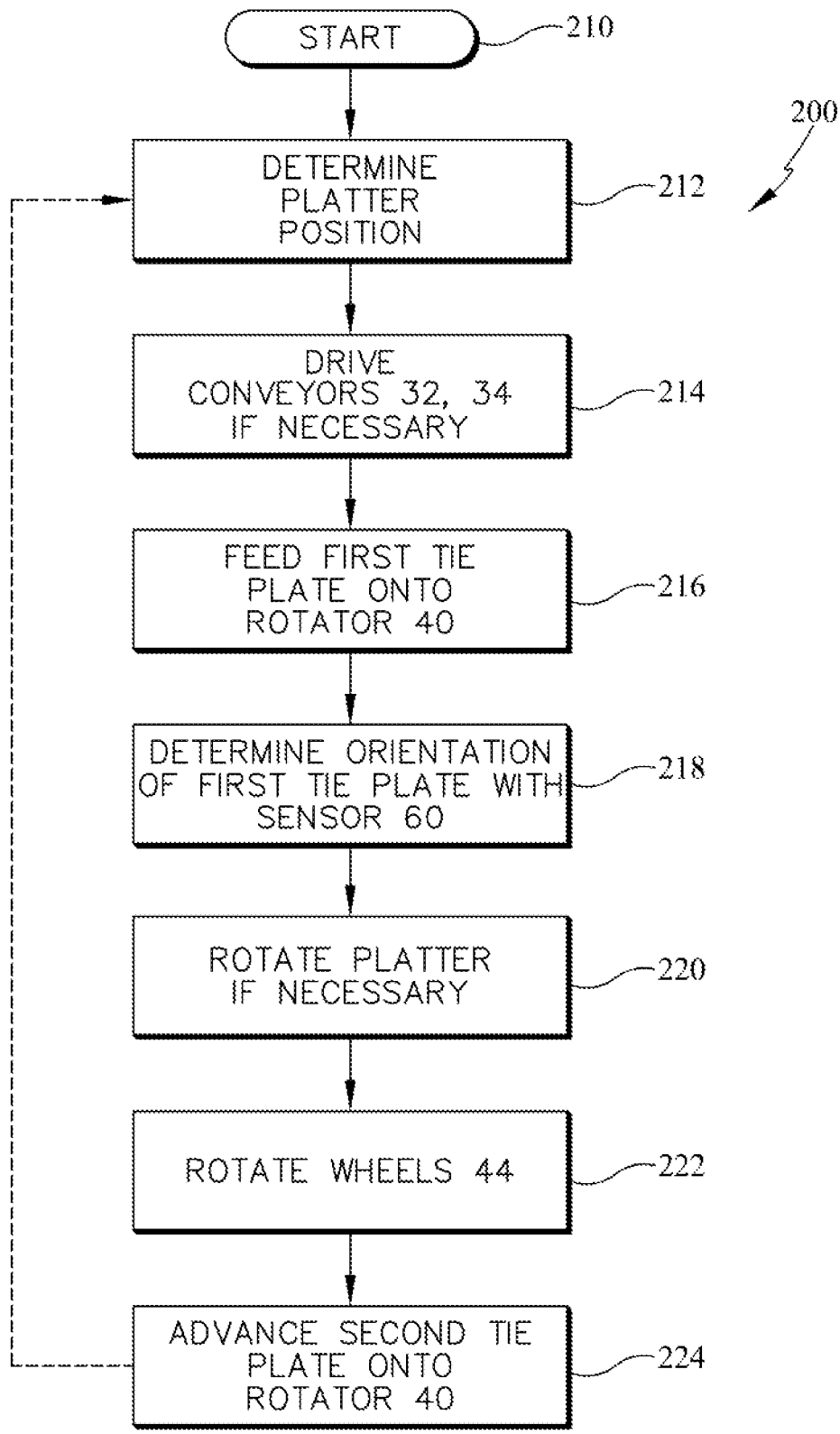
FIG. 10 is a flow chart of decision making which may be made by the one or more controllers of the tie plate rotator.

Referring now to FIG. 10, a flow chart is shown providing an illustrative, non-limiting decision making process by the controller 80. In the method or process 200, the control 80 starts at step 210 and determines a position of the platter 42 at step 212. This may be determined in real time or stored in memory based on a previous use. Also, while this step is shown in the beginning of the process, it need not be performed at this instant but alternatively may be performed at an alternate time of the process 200.

The process 200 also comprises at step 214 driving conveyors 32, 34, if necessary, for example if the conveyors are inclined or flat. If the conveyor is declined, then the gravity may direct movement of the series of tie plates. The conveyors may be a plurality of structures and therefore may be driven in a variety of manners.

In the next step 216, the first tie plate 10 is fed from the first conveyor 32 to the rotator 40 either in driven fashion or un-driven, for example by gravity. Next, at step 218, the sensor 60 senses a shoulder 16, 18 to aid in determining an orientation of the first tie plate 10. If the shoulder 16, 18 is sensed, then a signal indicating such may be sent to the controller 80. Alternatively, if no shoulder 16, 18 is sensed, then an appropriate signal is sent or may not be sent to the controller 80. As a result, the controller 80 may make a determination of the orientation of the tie plate 10 in the rotator 40.

In the next step 220, the rotator 40 may rotate the tie plate 10 from a first orientation to a second orientation.

Once the tie plate orientation is determined, or alternatively, before such occurs, the controller may also use signals from the at least one sensor 70 to determine a position of the platter 42. Once this position of platter 42 is determined through one or more sensors 70, 74, and a determination of tie plate orientation is made by sensor 60, the wheels 44 may also be rotated at step 222. This may occur by way of motor 43 to cause rotation of wheels 44. This movement may be created in other ways as well. The goal being movement of the tie plate 10 from the rotator 40 on to the second conveyor 34.

Next, the subsequent tie plate 10 may be advanced at step 224 from conveyor 32 on to the rotator 40 followed by orientation determination and rotation if necessary. This process may continue and loop until all tie plates are fed through the second conveyor 34.

Figure 11:
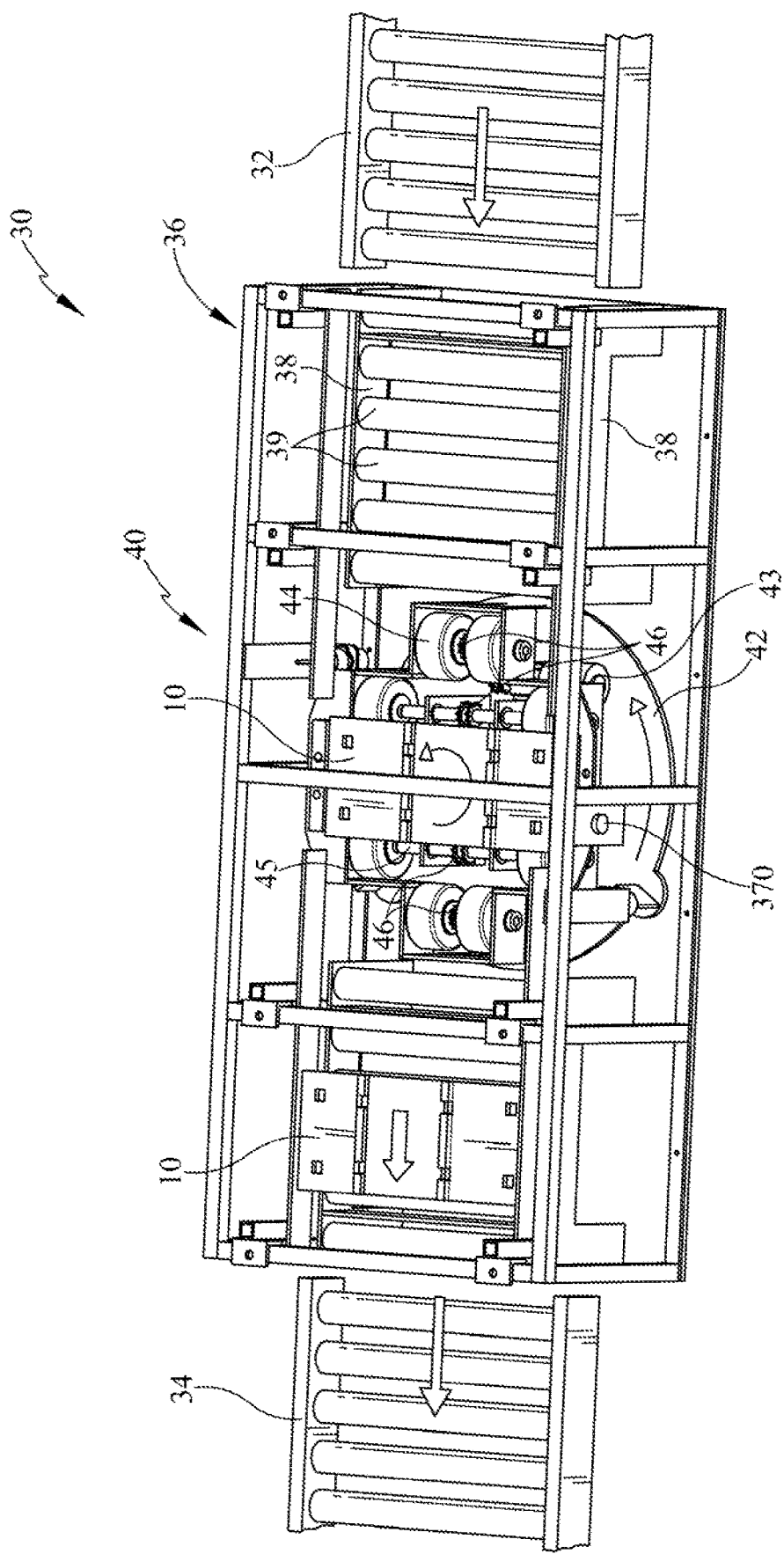
FIG. 11 is a perspective view of an alternate embodiment which may be manually actuated to rotate tie plates.

Referring additionally to FIG. 11, an alternative embodiment is depicted. In this embodiment, one or more sensors may be eliminated. In this embodiment, a button actuator 370 is provided along the distribution system 30. The button 370 may be located in a location close to the platter 42 where a worker may view the orientation of the tie plate on the platter 42. The button 370 may be in electrical communication with the controller 80. When the button 370 is actuated, a signal may be sent to the controller which causes the motor 50 to rotate the platter 42. Similarly, once rotated, the motor 43 may be actuated by the controller to rotate the wheels 44, or a belt or other driven structure, in order to move the tie plate 10 on the platter 42.

As related to this embodiment, in operation, the tie plates 10 travel along a first conveyor 32, and are one at a time positioned on the platter 42. As each tie plate 10 is positioned thereon, a person, such as a worker, may view the tie plate orientation and make a determination if the tie plate 10 is oriented correctly or incorrectly. Once the person determines that the tie plate 10 is oriented incorrectly, the button 370 may be pressed to actuate rotation of the platter 42. This may be done by way of motor 50, to rotate the platter 180 degrees for example. Next the motor 43 may direct rotation of the wheels 44 which moves the tie plate 10 on to conveyor 34. At this time, or shortly after, the next tie plate 10 may be moved from conveyor 32 on to the platter 42. In the event that a tie plate 10 is oriented correctly when arriving on the platter 42, the user may have one or more options. In some embodiments, the controller 80 may have a timer that moves the tie plate 10 from the platter 42 to the second conveyor 34 when a certain period of time passes. Alternatively, the button 370 may be depressed a second time after a certain period of time to move the tie plate 10 to conveyor 34. In another embodiment, a second button may be used to advance the tie plate to the conveyor 34, rather than waiting for a period of time.

In this embodiment, it may or may not be desirable to use at least one sensor 70, 74 so that the controller 80 receives a signal as to the rotational position of the platter 42.

Figure 12A:
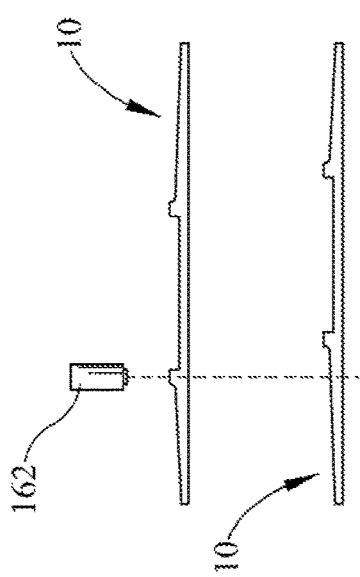
FIG. 12 is a side schematic view depicting various embodiments for operational description; and, FIG. 12A is a schematic view of two shoulder detection methods with a sensor.
Figure 12:
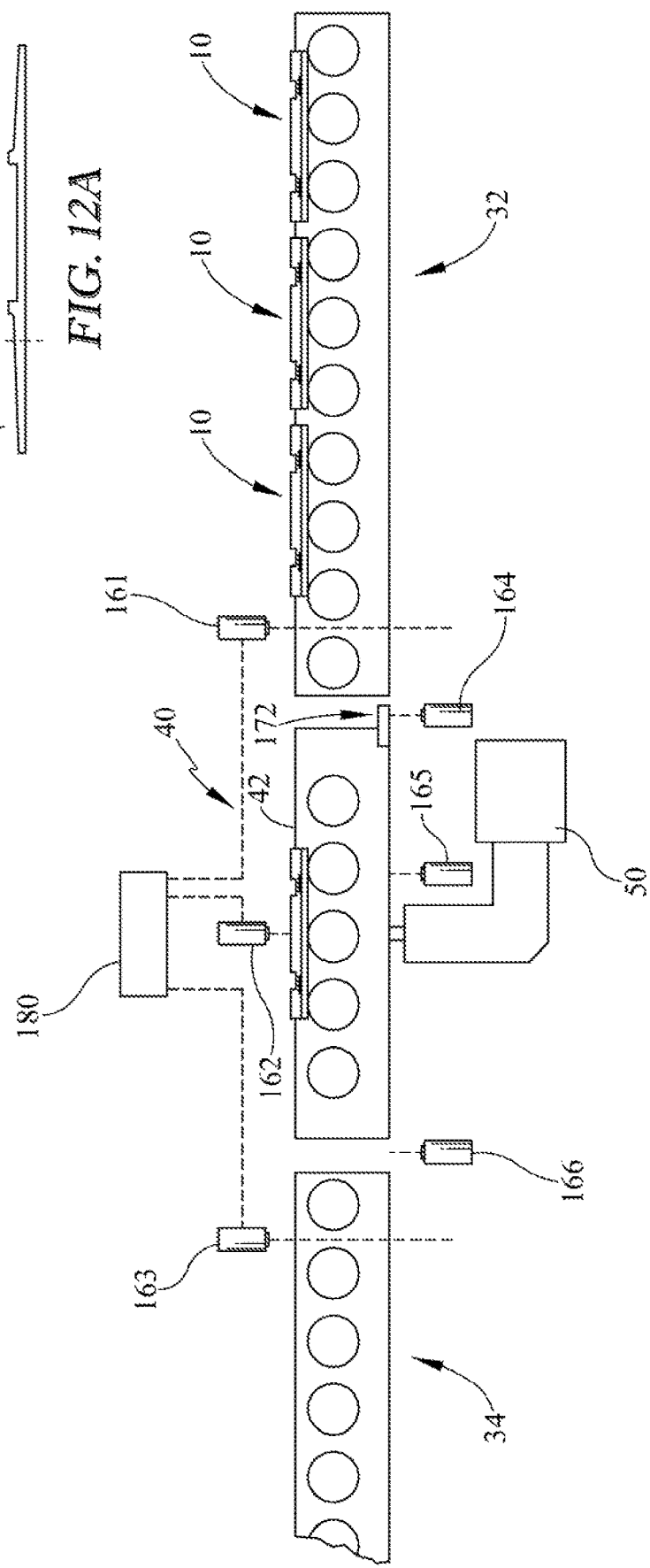

In some embodiments, a further description of an operation may be described as follows, and with reference to FIG. 12.

Example I

In the instant embodiment, the platter 42 may be rotated by an airservo, for non-limiting example. As the tie plates 10 move along the input conveyor, for example conveyor 32, a first sensor 161 may be used to detect and send a signal to a counter 180. The counter 180 may create a positive count for each tie plate that passes the first sensor 161. Alternatively, the counter 180 may reduce the count when a signal is received from sensor 163, indicating a tie plate 10 is exiting along exit conveyor 34. This positive negative counting may also be reversed for example. When the counter has a count of 0 or 1, the conveyor 32 may remain on and running, if it is driven or powered.

The wheels 44 (FIGS. 2, 7-8) of the tie plate rotator 40 may be activated by the counter 180 when the counter has a count of 1 or 2. The wheels 44 may be deactivated when the sensor 162 detects the shoulder of a tie plate 10 on the rotator 40 is in an undesirable orientation or position, or alternatively a desirable position depending on the desired attribute being detected. As shown in the schematic view (FIG. 12A), the second sensor 162 may detect a shoulder or may not (lower view) to provide input to the controller 80 (FIG. 9). The sensor 162 may detect or may not detect in order to provide a desired signal to the controller 80, as either embodiment is within the scope of the present embodiments.

Sensor 162 or an alternate sensor may also activate the rotation of the platter 42, for example via the controller 80. Once the platter 42 rotates 180 degrees, indicated by sensor 164 reading a flag 172, or by a timer allowing a set time for delay, the motor 43 (FIG. 9) driving wheels or rollers 44 may, if necessary, reverse direction, and re-activate sending the now desirable tie plate 10 to the discharge conveyor 34.

The discharge conveyor 34 may then activated by counter 180 to be on and running when the counter 180 has a count of 1 or 2.

The third sensor 163 will detect all plates that reach the discharge conveyor and trigger a signal to counter 180, creating a negative count of 1. This reduces the count of the counter 180.

Example II

In another embodiment, the operation is described and according to this description, the platter 42 may be rotated using an electric motor, for non-limiting example. This embodiment may utilize additional sensors to control the platter 42. The electric motor 50 (FIG. 9) for turning the platter 42 may be one which, for non-limiting example, utilizes a magnetic brake in this embodiment description.

When sensor 162 detects the shoulder of a tie plate 10 as in an undesired orientation, the electro-magnetic brake of the motor 50 will be deactivated and the motor 50 for platter 42 will activate until the flag 172 activates an additional sensor 165. Upon sensing flag 172 by sensor 165, the electric motor 50 for platter 42 may deactivate but inertia will continue to rotate platter 42 until the flag 172 activates a sensor 166. Sensor 166 will re-activate the electromagnet to act as a brake and stop the rotation of the platter 42. The sensor 165 may be at a plurality of locations along the circular movement path of the platter 42 between the positions of sensors 164 and 166. The polarity of the electric motor 50 of the platter 42 may be reversed and the polarity of contact for the motor 43 of wheels or rollers 44 may also be reversed to keep plate moving in one direction once the sensor 162 detects that the shoulder of tie plate 10, or alternative does not detect such shoulder, whichever is programmed to occur. Motor 50 for the platter 42 will be active in the reverse rotation until sensor 165 is triggered. This deactivates the motor with inertia continue rotation until sensor 165 is activated and triggers the magnet to brake rotation.

Example III

According to a further embodiment, the motor 50 may be a servo or stepper motor to rotate the platter 42. In this embodiment, the function is similar to that of the second example except that there may or may not be magnetic braking or additional sensors 165,166.

In this embodiment, once the sensor 162 detects the tie plate 10 is in an undesirable orientation, by either detecting or not detecting a shoulder, the servo or stepper motor 50 may begin rotation in appropriate direction. This may be dependent on whether a flag 172 triggers sensor 164 or sensor 166. The stepper motor 50 may be programmed to complete a 180 degree rotation to the desired orientation. Once the flag 172 triggers the opposite sensor 164 or 166, the wheels 44 will be activated in the appropriate direction to move the tie plate 10 in the exit direction.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The foregoing description of several methods and embodiments has been presented for purposes of illustration. It is not intended to be exhaustive or to limit the embodiments to the precise steps and/or forms disclosed, and obviously many modifications and variations are possible in light of the above teaching. It is intended that the scope of the embodiments and all equivalents be defined by the claims appended hereto.

The invention claimed is:

1. A tie plate rotator for field and gauge orientation, comprising:
   a feed conveyor;
   a rotatable conveyor which receives a material from the feed conveyor, said rotatable conveyor having rollers which each rotate about a roller axis and said conveyor capable of movement from a first location to a second location about a rotatable conveyor axis;
   a first sensor disposed at one of said feed conveyor or said rotatable conveyor and sensing an orientation of a tie plate; and,
   a first motor which rotates said rotatable conveyor and a second motor which drives conveying of said rotatable conveyor.

2. The tie plate rotator for field and gauge orientation, of claim 1, further comprising at least one second sensor which senses a position of the rotatable conveyor.

3. The tie plate rotator for field and gauge orientation, of claim 1, further comprising a sensor target disposed on said rotatable conveyor.

4. The tie plate rotator for field and gauge orientation, of claim 2, further comprising a third sensor.

5. The tie plate rotator for field and gauge orientation, of claim 4, further comprising a second sensor target for detection by said third sensor.

6. The tie plate rotator for field and gauge orientation, of claim 1, said first sensor detecting a tie plate shoulder in a first position.

7. The tie plate rotator for field and gauge orientation, of claim 6, said first sensor detecting a tie plate shoulder in a second position.

8. The tie plate rotator for field and gauge orientation, of claim 1 further comprising a transmission connected to said first motor.

9. A method of aligning tie plates, comprising the steps of:
   conveying a tie plate to a rotatable conveyor, said rotatable conveyor having rollers which rotate about a roller axis and which may additionally be moved from a first location to a second location;
   sensing with a sensor if a shoulder of said tie plate is in a preselected position;
   determining with a controller if said shoulder of said tie plate is in said preselected position; and,
   rotating said rotatable conveyor if said shoulder of said tie plate is in said preselected position.

10. The method of claim 9, further comprising driving a first motor during said rotating said rotatable conveyor.

11. The method of claim 10 further comprising detecting a position of said rotatable conveyor.

12. The method of claim 11 further comprising detecting at least one of two rotational limits.

13. The method of claim 11 further comprising detecting at least one sensor target.

14. The method of claim 13 said at least one sensor target being a first sensor target at a first rotational limit and a second sensor target at a second rotational limit.

15. The method of claim 9, further comprising actuating, with a button or switch, said rotating.

16. The method of claim 9, further comprising actuating, with a button or switch, a motor driving wheels of said rotatable conveyor.

17. The method of claim 9, wherein said preselected position is one of a desired position or an undesired position.

* * * * *